United States Patent

Lee

(10) Patent No.: US 9,239,114 B2
(45) Date of Patent: Jan. 19, 2016

(54) COMPRESSABLE SEALING RING ASSEMBLY

(71) Applicant: PGI International, Ltd., Houston, TX (US)

(72) Inventor: Ricardo Lee, Richmond, TX (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 0 days.

(21) Appl. No.: 13/668,549

(22) Filed: Nov. 5, 2012

(65) Prior Publication Data

US 2014/0125012 A1    May 8, 2014

(51) Int. Cl.
*F16J 15/20*    (2006.01)
*F16J 15/30*    (2006.01)

(52) U.S. Cl.
CPC . *F16J 15/20* (2013.01); *F16J 15/30* (2013.01)

(58) Field of Classification Search
USPC .................................. 277/511, 516, 529, 531
See application file for complete search history.

(56) References Cited

U.S. PATENT DOCUMENTS

| | | | | |
|---|---|---|---|---|
| 2,689,145 A * | 9/1954 | Magos | F16J 15/186 | 277/528 |
| 3,907,307 A * | 9/1975 | Maurer et al. | | 277/513 |
| 4,006,881 A * | 2/1977 | Gaillard | F16J 15/102 | 251/148 |
| 4,047,858 A * | 9/1977 | Zalis | | 418/201.1 |
| 4,082,300 A * | 4/1978 | Harbeck et al. | | 277/530 |
| 4,135,546 A * | 1/1979 | Morrison | | 137/315.28 |
| 4,157,833 A * | 6/1979 | Kozlowski | | 277/511 |
| 4,177,998 A * | 12/1979 | Laitkep | F16J 15/181 | 277/513 |
| 4,192,519 A * | 3/1980 | Buggele | | 277/638 |
| 4,270,760 A * | 6/1981 | Greiman | | 277/350 |
| 4,289,317 A * | 9/1981 | Kuc | | 277/308 |
| 4,328,974 A * | 5/1982 | White et al. | | 277/308 |
| 4,379,557 A * | 4/1983 | Saka | | 277/516 |
| 4,394,023 A | 7/1983 | Hinojosa | | |
| 4,433,847 A * | 2/1984 | Weinberg | | 277/342 |
| 4,440,404 A * | 4/1984 | Roach | F04B 53/164 | 277/530 |
| 4,527,806 A * | 7/1985 | Ungchusri | F16K 41/04 | 277/530 |
| 4,572,519 A * | 2/1986 | Cameron | F16J 15/183 | 277/512 |
| 4,576,385 A * | 3/1986 | Ungchusri | F16J 15/184 | 277/322 |
| 4,630,636 A * | 12/1986 | Cutcher | F16J 15/185 | 137/315.28 |
| 4,844,411 A * | 7/1989 | Nelson | F16K 41/04 | 251/214 |
| 4,886,241 A * | 12/1989 | Davis et al. | | 251/214 |
| 5,082,296 A * | 1/1992 | Aizawa et al. | | 277/610 |
| 5,257,812 A * | 11/1993 | Osorio | E21B 33/08 | 166/84.1 |
| 5,478,048 A * | 12/1995 | Salesky et al. | | 251/214 |
| 5,593,166 A * | 1/1997 | Lovell et al. | | 277/516 |
| 5,683,091 A * | 11/1997 | Isoe | F16J 15/125 | 277/610 |
| 6,318,729 B1 * | 11/2001 | Pitts et al. | | 277/511 |
| 7,108,058 B2 * | 9/2006 | Pippert | | 166/84.4 |
| 8,047,820 B2 * | 11/2011 | Merrick, III | F04B 47/00 | 277/513 |
| 8,132,785 B2 * | 3/2012 | Sugita et al. | | 251/214 |
| 2009/0289423 A1 * | 11/2009 | Sugita et al. | | 277/511 |

* cited by examiner

*Primary Examiner* — Kristina Fulton
*Assistant Examiner* — L. Susmitha Koneru
(74) *Attorney, Agent, or Firm* — Renner, Otto, Boisselle & Sklar, LLP

(57) ABSTRACT

A compressible sealing ring assembly seals an annulus between a radially outer member and a radially inner member. The sealing ring comprises one or more sealing ring members (28), a radially outer wall for sealing with the inner wall of the radially outer member and radially inner wall for sealing with the outer wall of the radially inner member. A compression ring member (10) having a concave lower surface and a convex upper surface exerts an axial force on a sealing ring member to deform the sealing ring member to maintain a seal.

13 Claims, 3 Drawing Sheets

COMPRESSABLE SEALING RING ASSEMBLY

FIELD OF THE INVENTION

The present invention relates to a packing assembly which may be used to seal a shaft that moves rotationally or linearly against the flow of fluids, particularly during high temperature operations. The packing assembly may be used to seal against a valve stem which actuates an internal valve element to effect the opening or closing of a valve.

BACKGROUND OF THE INVENTION

The current method of sealing valve stems uses metal packing adapter rings having configurations to cause structural deformation of the end surface portions of the grafoil rings, so that the inside of the grafoil seal rings maintain sealing capability in response to wear during use.

While the prior art seals are satisfactory for some applications, they do not provide an optimum sealing capability due to their configuration. The flat bottom of such seals prevents sideways extrusion forces from occurring, thereby diminishing the sealing force in these areas. A mismatch shape of the top and bottom of the rings will eventually cause there to be some packing material to be left in the cavity upon metal to metal contract.

The disadvantages of the prior art are overcome by the present invention, an improved compressable sealing ring assembly is hereinafter disclosed.

SUMMARY OF THE INVENTION

In one embodiment, a compressable sealing ring assembly seals an annulus between a radially outer member having an inner wall and a radially inner member having an outer wall. The sealing ring comprises of one or more sealing ring members, which may be grafoil rings. One or more compression ring members exert an axial force on the sealing ring members and deform the respective sealing ring members. Each compression ring member has a concave lower surface and a convex upper surface, a radially outer wall for engagement with the inner wall and a radially inner wall for engagement with the outer wall.

These and further features and advantages of the present invention will become apparent from the following detailed description, wherein reference is made to the figures in the accompanying drawings.

DETAILED DESCRIPTION OF PREFERRED EMBODIMENTS

Figure 1:
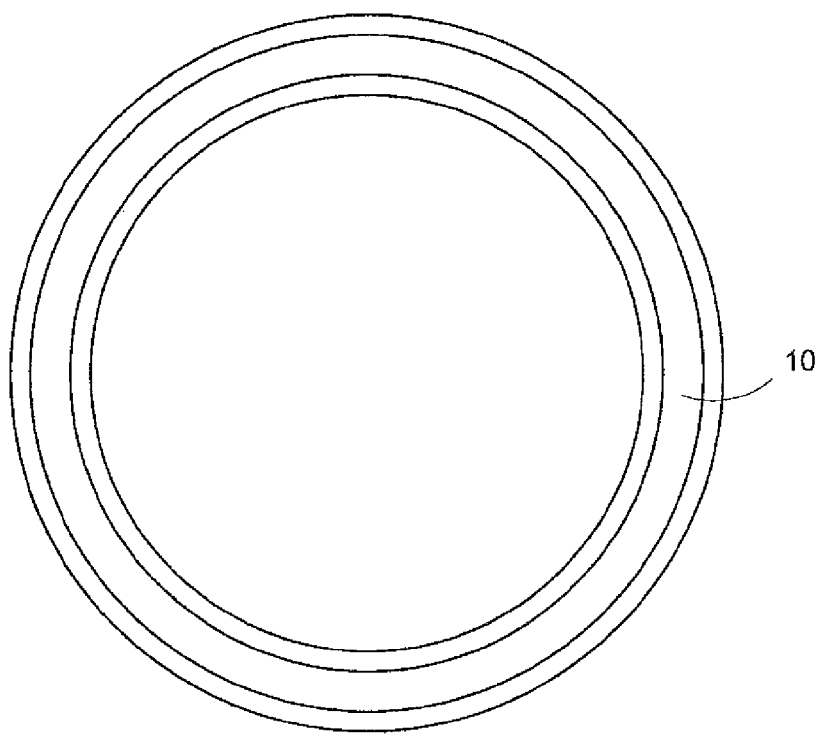
FIG. 1 is a top view of a compression ring.
Figure 2:
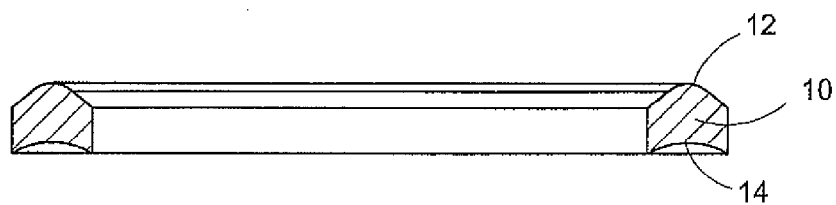
FIG. 2 is a cross-sectional view of the compression ring.

According to the present disclosure, the shaped convex top surface 12 and concave bottom surface 14 of the compression ring members 10, as shown in FIGS. 1 and 2, provide pressure to cause the sealing ring member 28 to seal while maintaining a desired chevron shape. This overcomes the problem with the prior art that result in differing pressures at the sealing boundary. A further feature of the design essentially guarantees extrusion of almost all available sealing material for obtaining sealing before seal replacement must occur.

A packing assembly may be provided for valves that are able to maintain a viable shaft seal during extreme temperature operations. An anti-extrusion feature includes the convex and concave top and bottom surfaces of the compression ring member which work in unison to help maintain the sealing material in the areas where it is needed.

Figure 3:
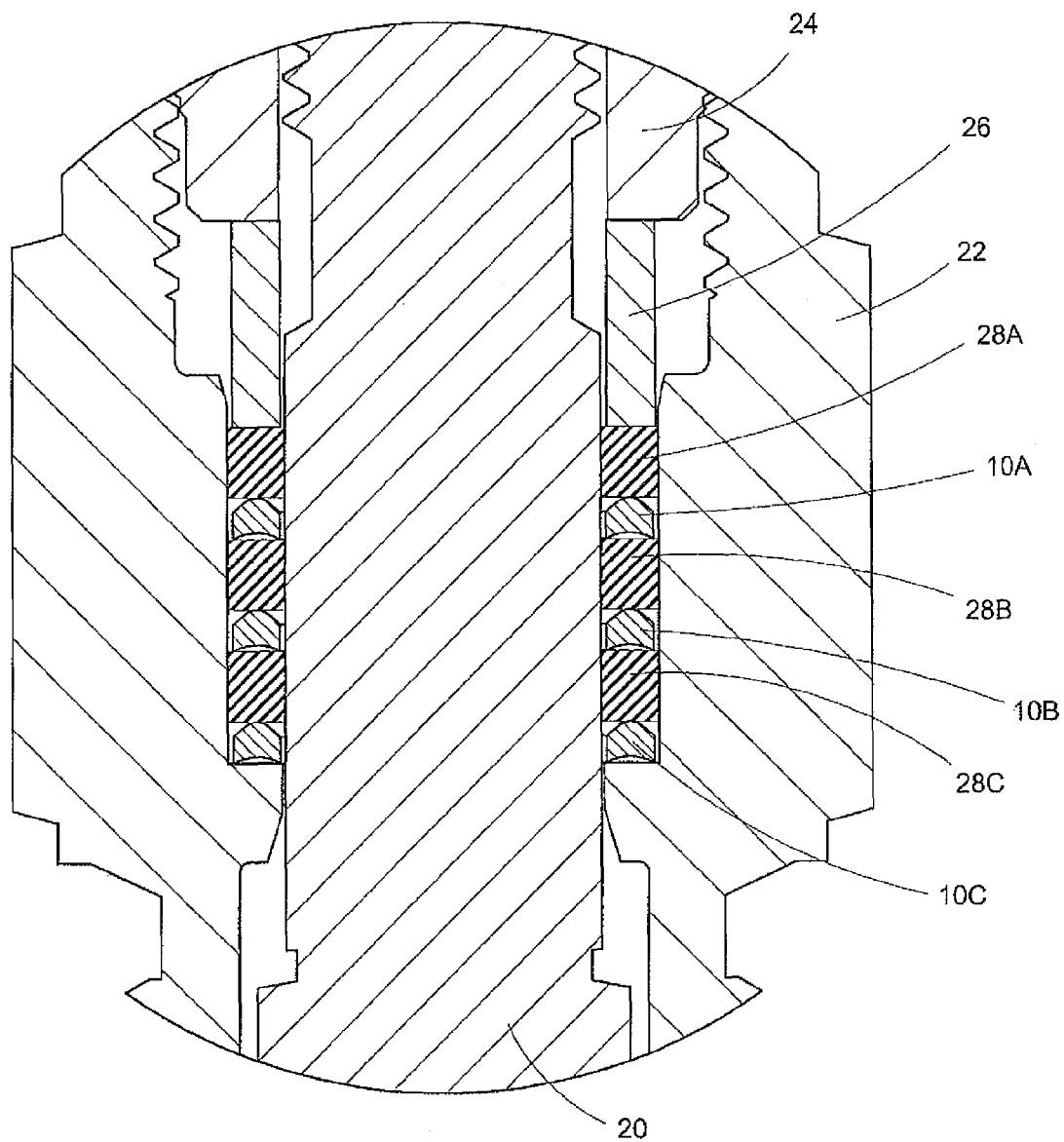
FIG. 3 shows the sealing rings between a valve bonnet and a valve stem, and compression rings between the sealing rings.

The high temperature packing assembly for a valve preferably utilizes a plurality of grafoil seal ring member 28, as shown in FIG. 3, and a plurality of compression ring members 10 that provide concave and convex compression surfaces that purposely deform the grafoil seal rings 28 in order to provide a higher compressive stress against the stem surface of the valve through a reduction in contact surface area and provocation of higher side loads. The packing assembly as shown in FIG. 3 includes compression ring members and sealing rings in their "as manufactured" condition, i.e., before being compressed to form a reliable seal. As noted below, the generally rectangular cross-section of the grafoil sealing ring members 28 deform in such a manner that they take on the overall shape of the compression rings at the top and the bottom, which results in a chevron shape which is beneficial to sealing capability.

The present invention also allows the loading on the grafoil seals to be continually adjusted so as to prevent or impede any leakage that may occur through normal use of valve. If a leak should occur at any time, a one eighth increment turn on the packing adjuster should realign the compression rings and force the grafoil to extrude out a little further into the stem bore to reinstate the desired seal.

Figure 4:
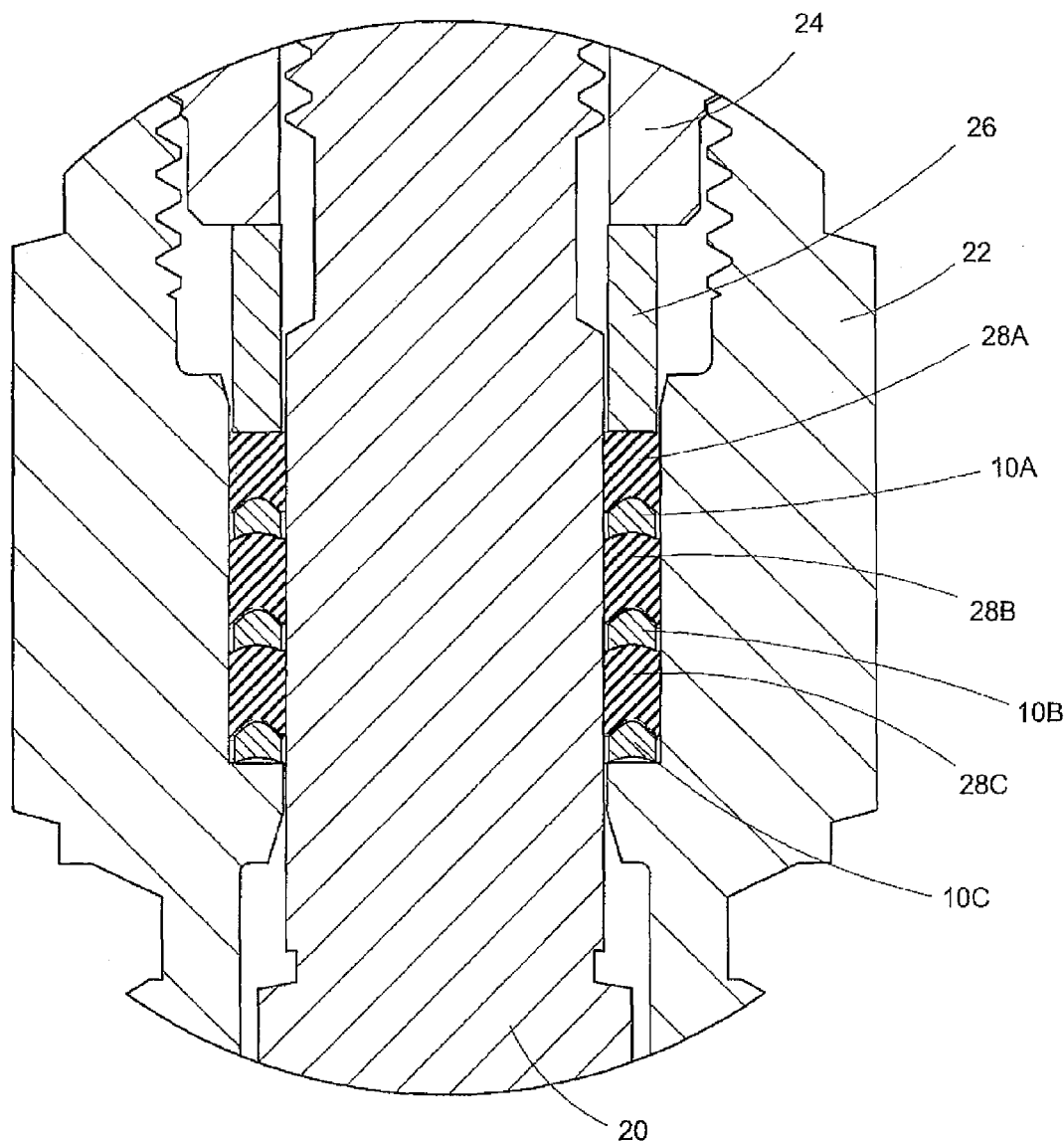
FIG. 4 shows the sealing rings and compression rings shown in FIG. 3 after an axial force is applied to the sealing rings and the compression rings to form a reliable seal.

FIG. 4 depicts a conventional valve stem 20 in a packing gland 22 with adjustable threaded member 24 exerting a force on ring 26, which in turn exerts a force on sealing ring member 28A, which compresses compression ring member 10A, which in turn exerts an axial force on sealing ring member 28B and compression ring member 10B, which exert an axial compression force on sealing ring member 28C and sealing ring member 10C. Each of the compression ring members 10 as shown in FIG. 4 thus have been deformed to a configuration with a concave lower surface and a convex upper surface of a seal ring substantially match the adjoining surface of a sealing ring member.

In preferred embodiments, the compressible sealing ring assembly comprises a plurality of grafoil sealing ring members, and the compression ring members each having a concave lower surface and a convex upper surface, a radially outer wall for engagement with inner wall, and a radially inner wall for engagement with an outer wall. The plurality of compression ring members exert an axial force on the sealing ring members to deform the sealing ring members to maintain a seal. The top and bottom surface of each sealing ring member 28 is initially substantially perpendicular to a radially outer wall of the compression ring member. While the sealing ring assembly is particularly well suited for sealing at high temperature applications with a valve stem, the sealing ring assembly may be used for sealing between various components which rotate or reciprocate relative to each other.

As disclosed herein, the radially lower concave surface of the each compression ring member extends substantially from a radially inner edge of the compression ring member to a radially outer edge of the compression ring member, and similarly the convex upper surface of each compression ring member extends substantially from a radially inner wall of the compression ring member to a radially outer wall of a compression ring member.

According to the method of the invention, the compression ring member is provided with a concave lower surface and a convex upper surface as disclosed herein, and the compression ring member exerts an axial force on a sealing ring member to deform the sealing ring member to maintain a seal. A plurality of stacked sealing ring members may thus be spaced between a respective one of the compression ring members. A ring shaped packing follower 26 is provided for exerting a compression force on the upper sealing ring member.

The assembly has a capability of resisting the effects of high temperatures by stacking alternately grafoil seal rings and compression sealing rings. The grafoil ring is deformed and compacted into a sealing surface by the packing follower that provides downward pressure and compresses and extrudes the grafoil between the compression sealing rings.

Although specific embodiments of the invention have been described herein in some detail, this has been done solely for the purposes of explaining the various aspects of the invention, and is not intended to limit the scope of the invention as defined in the claims which follow. Those skilled in the art will understand that the embodiment shown and described is exemplary, and various other substitutions, alterations and modifications, including but not limited to those design alternatives specifically discussed herein, may be made in the practice of the invention without departing from its scope.

What is claimed is:

1. A compressable sealing ring assembly for sealing an annulus of a packing box between a radially outer member having an inner wall and a radially inner member having an outer wall, the sealing ring assembly comprising:
   at least three annular compression ring members each having a concave lower surface and a convex upper surface, a radially outer wall for engagement with the inner wall and a radially inner wall for engagement with the outer wall;
   at least two annular sealing ring members each acted on by the concave lower surface of one of the compression ring members and acted on by the convex upper surface of another one of the compression ring members to deform the sealing ring members to maintain a seal, wherein prior to being acted on by the compression ring members, the sealing ring members each include upper and lower surfaces disposed substantially perpendicular to the radially inner and outer walls; a ring shaped packing follower having a substantially planar surface for exerting a force on a sealing ring member of the compressable sealing ring assembly, wherein the substantially planar surface is disposed substantially perpendicular to the radially inner and outer walls; and
   another sealing ring member acted on by the convex upper surface of one of the compression ring members and acted on by the substantially planar surface of the packing follower, wherein prior to being acted on by the one of the compression ring members and the packing follower, the another sealing ring member includes upper and lower surfaces disposed substantially perpendicular to the radially inner and outer walls,
   wherein an endmost one of the compression ring members has the concave lower surface thereof positioned for engagement with a planar surface of the packing box.

2. The compressable sealing ring assembly as defined in claim 1, wherein the sealing ring members are formed from a flexible graphite material.

3. The compressable sealing ring assembly as defined in claim 1, wherein the sealing ring assembly comprises a plurality of stacked sealing ring members and a plurality of stacked compression ring members, with at least one compression ring member having an upper and a lower compression ring surface in engagement with respective sealing ring members when an axial force is applied to the sealing ring members.

4. The compressable sealing ring assembly as defined in claim 1, wherein top surfaces of the sealing ring members are substantially perpendicular to radically inner walls of the compression ring members before an axial force is applied to the sealing ring members.

5. The compressable sealing ring assembly as defined in claim 1, wherein lower surfaces of the sealing ring members are substantially perpendicular to the radially outer walls of the compression ring members before an axial force is applied to the sealing ring members.

6. A compressable sealing ring assembly for sealing an annulus of a packing box between a radially outer member having an inner wall and a radially inner member having an outer wall, the sealing ring assembly comprising:
   a plurality of annular spaced compression ring members each having a concave lower surface and a convex upper surface, a radially outer wall for engagement with the inner wall and a radially inner wall for engagement with the outer wall;
   a plurality of annular spaced sealing ring members each acted on by a respective compression ring member to deform the sealing ring member to maintain a seal; and
   a ring shaped packing follower having a substantially planar surface for exerting a force on one of the sealing ring members, wherein the substantially planar surface is disposed substantially perpendicular to the radially inner and outer walls;
   wherein two of the plurality of spaced sealing ring members are each acted on by the concave lower surface of a compression ring member of the plurality of compression ring members and acted on by the convex upper surface of another compression ring member of the plurality of compression ring members,
   wherein another one of the plurality of spaced sealing ring members is acted upon by the convex upper surface of a compression ring member of the plurality of compression ring members and acted upon by the substantially planar surface of the packing follower, and wherein prior to being acted on by the compression ring members and the packing follower, the sealing ring members each include upper and lower surfaces disposed substantially perpendicular to the radially inner and outer walls, and
   wherein an endmost one of the plurality of compression ring members has the concave lower surface thereof positioned for engagement with a planar surface of the packing box.

7. The compressable sealing ring assembly as defined in claim 6, wherein each sealing ring member is formed from a flexible graphite material.

8. The compressable sealing ring as defined in claim 6, wherein top surfaces of the sealing ring members are substantially perpendicular to radially inner walls of the compression ring members before an axial force is applied to the sealing ring members.

9. The compressable sealing ring as defined in claim 6, wherein lower surfaces of the sealing ring members are substantially perpendicular to the radially outer walls of the compression ring members before an axial force is applied to the sealing ring members.

10. A method of sealing with a sealing ring assembly an annulus of a packing box between a radially outer member having an inner wall and a radially inner member having an outer wall, the method comprising:
provide at least three annular compression ring members each having a concave lower surface and a convex upper surface, a radially outer wall for engagement with the inner wall and a radially inner wall for engagement with the outer wall;
providing at least two annular sealing ring members each acted on by the concave lower surface of one of the compression ring members and acted on by the convex upper surface of another one of the compression ring members to deform the sealing ring members to maintain a seal, wherein prior to being acted on by the compression ring members, the sealing ring members each includes upper and lower surfaces disposed substantially perpendicular to the radially inner and outer walls;
providing a ring shaped packing follower having a substantially planar surface for exerting a force on a sealing ring member, wherein the substantially planar surface is disposed substantially perpendicular to the radially inner and outer walls;
providing another sealing ring member acted on by the convex upper surface of one of the compression ring members and acted on by the substantially planar surface of the packing follower, wherein prior to being acted on by the one of the compression ring members and the packing follower, the another sealing ring member includes upper and lower surfaces disposed substantially perpendicular to the radially inner and outer walls; and
providing an endmost one of the at least three annular compression ring members having the lower concave surface thereof positioned for engagement with a planar surface of the packing box.

11. The method as defined in claim 10, wherein the sealing ring assembly comprises a plurality of stacked sealing ring members and a plurality of stacked compression ring members, with at least one sealing ring member having an upper and a lower compression ring member in engagement therewith.

12. The method as defined in claim 10, wherein top surfaces of the sealing ring members are substantially perpendicular to radially inner walls of the compression ring members before an axial force is applied to the sealing ring members.

13. The method as defined in claim 10, wherein lower surfaces of the sealing ring members are substantially perpendicular to the radially outer walls of the compression ring members before an axial force is applied to the sealing ring members.

* * * * *